United States Patent Office 3,611,643
Patented Oct. 12, 1971

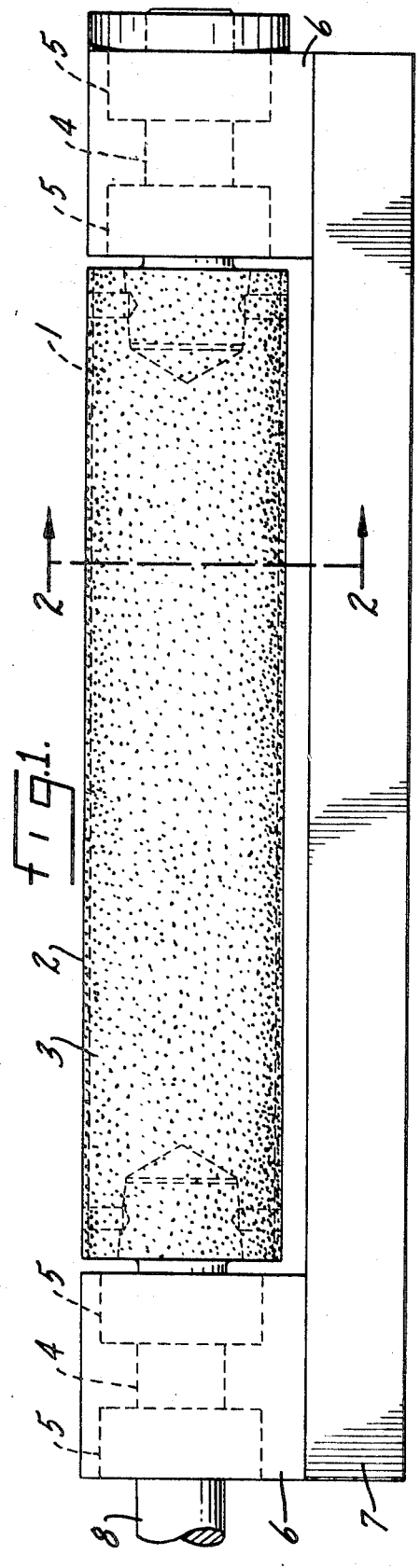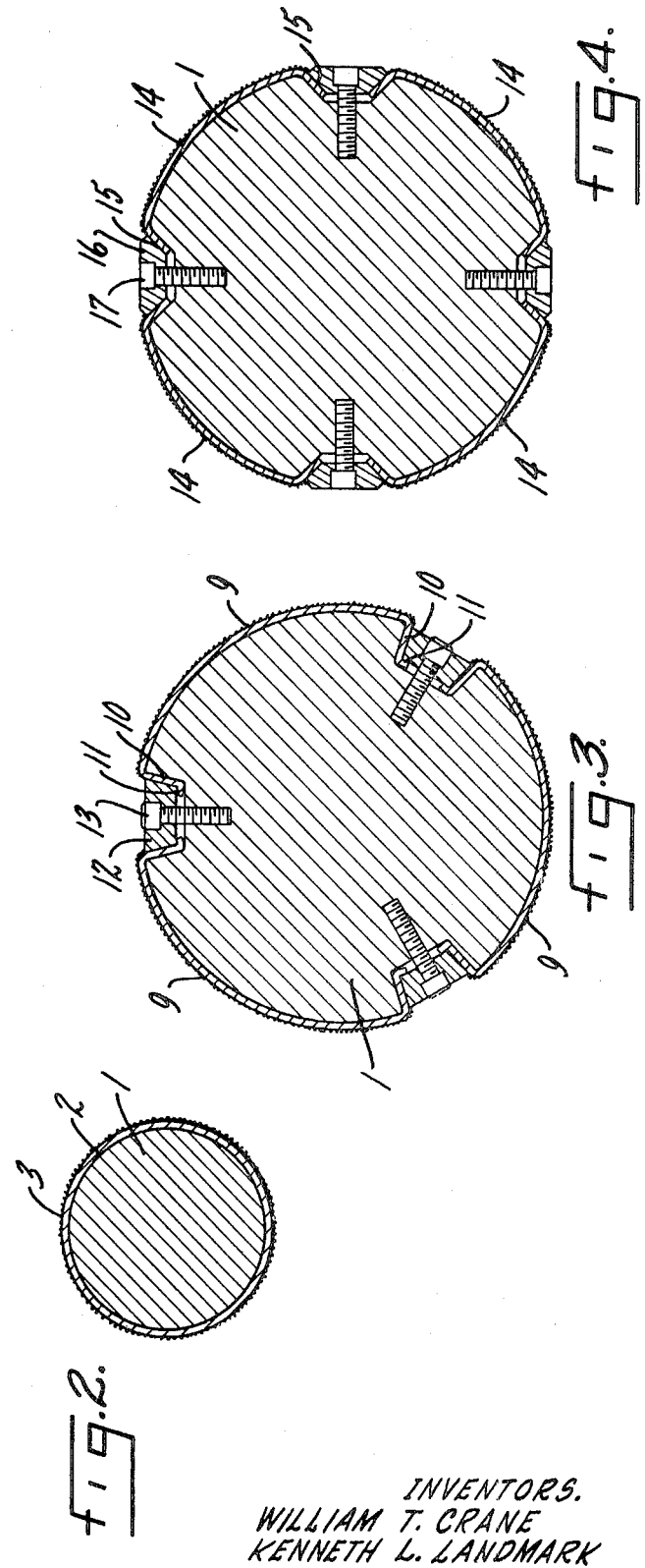

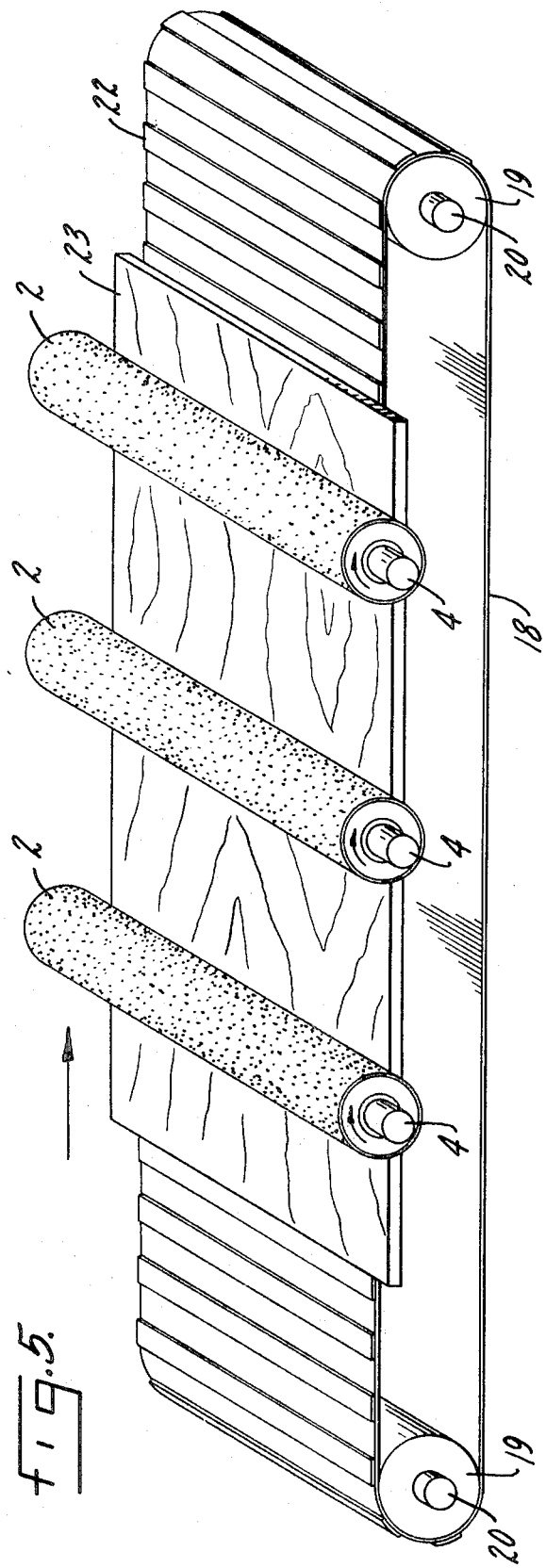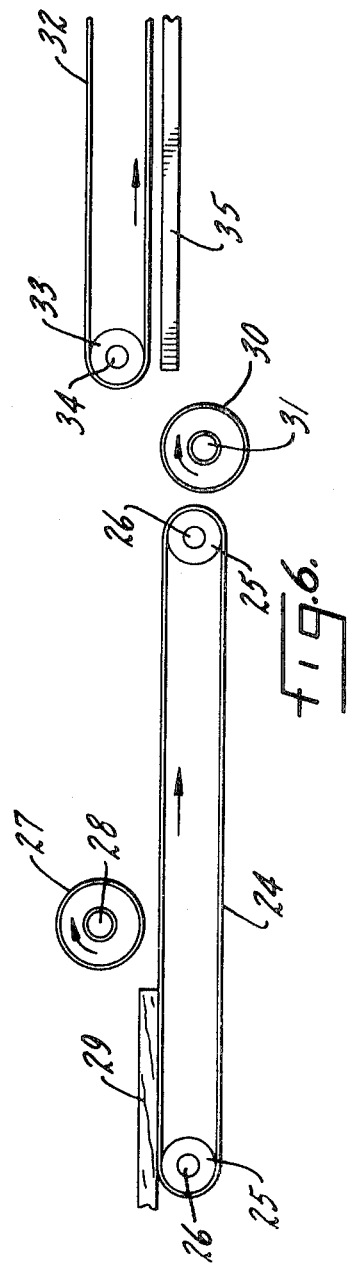

3,611,643
PLANING MACHINE USING ROTATABLE ABRASIVE DRUMS
William T. Crane, Geneva, and Kenneth L. Landmark, St. Charles, Ill., assignors to Burgess-Norton Mfg. Co., Geneva, Ill.
Filed Oct. 4, 1968, Ser. No. 765,103
Int. Cl. B24b 7/12; B24d 5/00
U.S. Cl. 51—76                                5 Claims

ABSTRACT OF THE DISCLOSURE

A planing means for planing wood, fibre or comparable material including a rotary drum and a metal sleeve carrying tungsten carbide grit. The sleeve is shrunk on the drum which acts as an arbor to support and rotate the grit carrying sleeve. One or more drums and grit carrying sleeve assemblies are mounted in a machine and are rotated in contact with wood or equivalent material which is to be planed and is given a smooth surface comparable to that which is given by a conventional assembly with planar blades. Such drums may be mounted solely above the workpiece or above and below the workpiece.

---

This invention relates to a means and a method for planing, sanding or grinding all flat non-metallic materials. Among the materials which can be readily treated by the means and method of this invention are wood, fiber and generally equivalent flat materials.

It has for one object to provide a means and a method for planing wood to reduce the waste presently resulting from the use of a conventional blade planer.

It has for another object to provide a method and means for smoothing any flat non-metallic material which can be readily conveyed past a position of work at which a grinding member in contact with the material being treated is effective to plane, grind or otherwise smooth the material to give it a satisfactory smoothness with a minimum of waste of material and hence a maximum of economy.

Other objects will appear from time to time in the following description and claims.

The invention is illustrated more or less diagrammatically in the accompanying drawings wherein:

FIG. 1 is a side elevation of one form of the device of the invention which is suitable for carrying out the method of the invention, FIG. 2 is a transverse section taken at line 2—2 of FIG. 1, FIG. 3 is a sectional detail on an enlarged scale illustrating a modified form of the device, FIG. 4 is a view similar to FIG. 3 illustrating a further modification, FIG. 5 is a schematic diagram illustrating an apparatus for planing or finishing lumber or comparable material, and FIG. 6 illustrates a modification in which an abrasive drum is positioned above the workpiece and another is positioned below the workpiece.

Like numerals will be used to designate like parts in the following description of the invention.

One form of the device is illustrated in FIGS. 1 and 2 in which a drum or arbor 1 receives a sleeve 2 which is in close contact with the arbor and may be heated and shrunk upon the arbor to provide a tight and unyielding fit. The surface of the sleeve 2 has secured to it, preferably by brazing, a quantity of tungsten carbide grit 3. The arbor 1 is supported upon trunnions 4 which are themselves carried by an anti-friction bearing 5 mounted within a housing 6 supported upon a base 7. One of the trunnions 4 is extended, as at 8, and is connected to a source of power by means of which it is rotated.

A modified form of rotary planing or grinding member is shown in FIG. 3. As shown in this figure, three arcuate members 9 which carry the abrasive grit are provided with inwardly bent portions 10 which terminate in flanges 11. The members 9 extend generally from end to end of the drum 1 and are held in place by holding strips 12 which are themselves secured to the drum by means of screws, rivets or comparable fastening means 13. In the form of the device shown in FIG. 3, the drum 1 is suitably grooved to receive the portions 10 and 11 of the abrasive strips and to receive also the holding strips 12. The abrasive strips 9 are preferably in contact with the outer surface of the drum and are thus rigidly supported by the drum 1.

In the further modification of FIG. 4, the drum 1 has positioned upon it strips 14 which are inwardly bent, as at 15, and these inwardly bent portions are engaged by holding strips 16 which are themselves held in place on the drum by screws, rivets, or comparable means 17. The drum 1 is grooved to receive the inwardly bent ends 15 of the strips 14 and also to receive the holding strips 16.

From FIGS. 1, 3, 4 and 5, it is clear that the abrasive carrying parts of the assembly may be in the form of a unitary tube or sleeve as shown in FIGS. 1 and 5 or it may be in the form of separate strips as shown in FIGS. 3 and 4. In any of the forms of the invention the abrasive carry member is in solid contact with the drum so that it is solidly supported throughout by the drum.

The planing members thus present to the workpiece with which they are in contact, a circular surface formed by a unitary member or by a relatively small number of arcuate members. In each case, grit such as tungsten carbide particles is present upon the exterior of the members 2, 9 and 14.

FIG. 5 illustrates diagrammatically one form of an assembly in which the device of the invention may be utilized to carry out the method of the invention. As shown in FIG. 5, a belt 18 is supported upon rollers 19 and shafts 20. Means not shown are supplied for positively driving one of the members 19 which contacts the conveyor belt 18 upon which are mounted slats or other workpiece engaging members 22. The driving means for driving the belt are not shown because their details form no essential part of the present invention. A conveyor belt for carrying workpieces past a planer or grinder is conventional. It is sufficient for the purposes of the present invention that means be provided for moving the workpiece 23 in the direction of the arrow of FIG. 5 and this motion carries the workpiece along in contact with the abrasive sleeves 2 so that they operate upon the surface of the workpiece to grind, plane or otherwise modify the surface of the workpiece.

Means are provided for rotating the abrasive sleeves 2 in the direction of the curved arrows shown in FIG. 5. The driving means for rotating the drums are not shown since their details form no part of the present invention. It is sufficient for that purpose that means be provided for rotating the abrasive carrying drums.

As shown, the workpiece is carried from left to right in the direction of the straight arrow of FIG. 5 and the abrasive carrying drums rotate in a clockwise direction. The workpiece is supported by the carrying belt 18 and is firmly held in relation to the abrasive carrying drums so that the workpiece cannot move downwardly away from the drums but is supported positively in relation to the center of rotation of the drums. Thus the drums are effective to modify the surface of the workpiece as the latter moves along under the drums and the drums and the carrying belt may be adjustably positioned with respect to each other so that a predetermined quantity of material is removed from the surface of the workpiece which is brought into contact with the abrasive carrying drums.

Three drums with abrasive grit are shown in FIG. 5. The invention is not limited to any particular number of drums. It is preferable, however, to have at least three. They are of different degrees or qualities of abrasiveness. Thus the lefthand drum 2 of FIG. 5 is preferably provided with coarse tungsten carbide grit. The second or middle drum 2 of FIG. 5 is preferably provided with medium tungsten carbide grit and the third or righthand drum 2 is preferably provided with fine tungsten carbide grit.

From the above, it is evident that as the workpiece 23 moves in the direction of the straight arrow of FIG. 5 it contacts first a relatively coarse abrasive drum, then a finer abrasive drum and finally a still finer abrasive drum. The effect of this is that as the workpiece moves through the mechanism, it contacts drums of several different degrees of abrasiveness, the coarsest being the first contacted and the finest being the last contacted.

Experience has shown that by this arrangement of abrasive drums and by carrying out the method, the workpiece as it moves through the mechanism is successively and separately treated by abrasive drums of different degrees of abrasiveness and a finer finish is produced on the workpiece. That is to say, a finish smoother and finer than that which can be achieved by the use of stationary blade planing mechanisms.

In the modified form of FIG. 6, an abrasive drum is provided above the workpiece and another is provided below it. When this is done, the conveying mechanism is modified from the form shown in FIG. 5. Thus there is a first conveyor 24 which may conveniently be an endless belt which is provided with a support, not shown, beneath it to hold it positively in a definite plane and thus to prevent sagging or distortion. It is positioned about rotary parts 25, 25 carried on shafts 26, 26. One of the rotary parts or members 25 is driven by driving means, not shown, which are effective to move the conveyor in the direction of the lefthand arrow of FIG. 6.

An abrasive drum 27 is carried upon a shaft 28 and is driven by means not shown. It is preferably caused to rotate in the direction of the arrow shown on it.

A workpiece 29 is carried by the conveyor 24 beneath the abrasive drum. The dimensions of the parts are such that the drum 27 contacts the workpiece 29 and reduces its size a minimum by removing from its surface a minimum of material. The result of this is to provide a smooth or smoother upper surface on the workpiece.

The belt 24 is effective to carry the workpiece beneath the drum 27 and to the right until it contacts an abrasive drum 30 which is carried on a shaft 31 and rotated by means not shown in the direction of the arrow upon the drum 30. A second conveyor belt 32 is positioned about pulleys or rollers 33 carried upon shafts or trunnions 34. Only one member 33 is shown because it is obvious that there is a pulley or roller at the opposite end of the belt 32 which is identical to the pulley or roller 33 and completes the belt assembly. One of the members such as the roller or pulley 33 is driven to rotate it and to drive the belt.

There is a support 35 beneath the belt 32 which is in the form of a table and constitutes a surface upon which the workpiece is supported as it is moved under the belt 32.

As the workpiece passes the abrasive drum 30, material is removed from its lower surface and that surface is thus smoothed by the removal of a minimum of material.

Although only two abrasive drums are shown in FIG. 6, it is obvious that the construction of that figure may have a plurality of abrasive drums arranged to contact the workpiece successively as it moves to the right from the position shown in FIG. 6. Thus if desired, abrasive drums of different degrees of abrasiveness may be positioned in the path of the workpiece so that the workpiece is contacted first by a course drum, thereafter by a drum of intermediate abrasiveness and finally by a drum of further reduced abrasiveness. The invention is thus not limited to any number of drums and as shown in FIGS. 5 and 6, it may be embodied in a mechanism having a plurality of drums or in a mechanism having a single drum above and below.

An important advantage of the method of use of the device shown is that it avoids what is known as "tearout." In conventional practice with a blade planer, when a knot or knothole is struck by the planer, a rough spot is frequently produced and this is a definite disadvantage because the surface smoothness which is desired is lost. Experience has shown that the device of this invention in use avoids "tearout" which never occurs. Thus the method of this invention produces a uniformly smooth surface on the workpiece which has been treated.

A further important advantage is that with the structure of the present invention, when the method of this invention is carried out, greatly improved tool life is always achieved. In one of the machines now in continuing use, 280,000 4 x 8 panels have been turned out to date and the assembly is still in proper working order and is in active use. The quality of finish given to the workpiece is superior to that given to the workpiece by a conventional blade planer, whose life is many times shorter that the life thus far accomplished when the present method has been carried out on the mechanism which is disclosed.

Another important advantage inherent in the present method is that using the method and structure of this invention in a practical production machine, twenty-five 4 x 8 panels are regularly turned out per minute. In conventional devices, the production is of the order of two such panels per minute.

While the mechanism has been spoken of as a planer, it may also be arranged as a finisher. The degree of abrasiveness of the drums 2, 27 and 30 may be chosen to produce a coarse cut or a fine cut. Where the mechanism is arranged to provide a coarse cut, the workpiece after treatment will be what is generally known as "finished lumber" such as the usual 2 x 4 or plank. Where the workpiece is to be used in finer work such as cabinet work, it may be treated in a machine having a finer degree of abrasiveness.

While the drawings disclose relatively long abrasive sleeves carrying drums made as a unit as shown in FIG. 2 or made in sections as shown in FIGS. 3 and 4 and mounted preferably upon solid steel mandrils, it is within the contemplation of the invention to use relatively short mandrils upon the periphery of which are fixed relatively narrow abrasive sleeves and the invention is not limited to any particular metal for the construction of the mandril. While they normally will be formed of steel, they can be, when desired, be formed of aluminum or other metals. The method is not limited to the treatment of any particular non-metallic material and it may be used to grind rubber in addition to the materials mentioned above.

Whatever form the mechanism takes, whether course or fine abrasive sleeves are used, practical experience has shown that they do not tear out the material as do conventional planers. In addition, they do not load with the material which has been removed from the workpiece treated. This is a vital advantage because the drums require a minimum of cleaning and hence their use results in a minimum of "downtime." Conventional planers and conventional abrasive devices require frequent cleaning because of "loading."

A further important advantage lies in the fact that the drums remain cool. This is important because a cool drum is less likely to load than a hot drum. This is also important because a cool drum does not damage the wood or any other material which may be treated. The cool running effect is in part due to the fact that the grit members are fairly widely spaced.

The drums disclosed herewith and the method disclosed have been found in practice to avoid loading not only when wood and comparable materials are treated but also when rubber is treated and even when painted or shellaced surfaces are treated. With conventional planers and smoothers or any type now available, loading has been a major disadvantage and consequently a major expense, particularly when painted or shellaced surfaces are acted upon.

The use and operation of the invention are as follows:

In the past, boards and comparable articles have been planed after they have been sawn. In the past, such planing has been carried out by a rotary drum upon which are fixed a series of blades. These blades are at such distances from each other on the drum which carries them that when rotated at a suitable speed, they give to the board which is carried past them and held in contact with them a relatively smooth surface. Actually this surface is not totally smooth but is in a sense fluted. However it gives a reasonably satisfactory impression of smoothness.

To accomplish satisfactory planing according to the known practice just described, it has been necessary to remove as much as a quarter of an inch of wood. If a "2 x 4" is to be produced smooth on all faces and if this is to be done by conventional planing practices, the strip of wood as it leaves the saw must be approximately two and one-half inches in thickness and four and one-half inches in width. Since the planing takes a quarter of an inch from each surface, a half inch of thickness and a half inch of width is removed by the conventional planing and so reduces to chips or sawdust and is thus wasted.

Experience has shown that when the method of the present invention is carried out by the structure of the invention, less than half as much material is wasted. Thus by the use of the apparatus shown, a board coming from the saw and being smoothed or in effect "planed" by the structure and method of the present invention will always lose no more than one-eighth of an inch on each of the surfaces which is created by the abrasive sleeve. Thus a board which when finished is to be a 2 x 4 will be cut to a size of two and one-quarter inches by four and one-quarter inches and after treatment in accordance with the present invention an accurate 2 x 4 is produced which will have on all surfaces a smoother finish than that which is possible by the use of conventional blade planers. It is obvious that over a substantial number of boards a very impressive saving of material is accomplished when the structure and method of the present invention are used.

The method may involve the use of one or any desired number of abrasive drums. Three are shown and as above mentioned, they are of different degrees of abrasiveness and they are arranged in the path of movement of the workpiece. They are so arranged that the coarsest abrasive drum is the first contacted by the workpiece and the final abrasive drum which is contacted is of the finest degree of abrasiveness. The drums may be so arranged that each takes a different "cut" or they may be arranged so that each takes a cut of the same degree but they are mounted so that each contacts the workpiece and removes a sum material from the workpiece.

It is preferable to have the direction of rotation of the abrasive drums such that at the point of contact of each with the workpiece, the drum is moving in a direction opposite to the forward motion of the workpiece through the mechanism. It is essential that the workpiece be prevented from downward movement away from the drums. Means which are not shown in the diagrammatic drawing of FIG. 5 are provided to prevent the belt from sagging or moving downward away from the fixed plane in which it moves during the time that the workpiece is in contact with the drums and is thus being worked upon by the drums.

What is claimed is:
1. In a surface treating machine,
   a first and second conveyors having carrying surfaces located in a single plane and adapted to move in the same direction,
   a rotatable abrasive drum positioned above said first conveyor and a second rotatable abrasive drum positioned adjacent said second conveyor,
   each abrasive drum being positioned to contact a workpiece carried by said conveyors,
   said abrasive drum each including a rigid arbor supporting a metal sleeve having abrasive particles adhered to the working surface thereof,
   each metal sleeve of each abrasive drum being formed in sections which are secured to said arbor.
2. The machine of claim 1 further characterized in that said sections are secured to said arbors by holding strips and bolts.
3. The machine of claim 2 further characterized in that said sections are arcuate in cross-section.
4. The machine of claim 2 further characterized in that grooves are formed in said arbors and said holding strips and bolts are recessed in said grooves.
5. The machine of claim 4 further characterized in that said sections have flanges which extend under and are clamped by said holding strips.

References Cited

UNITED STATES PATENTS

| | | | |
|---|---|---|---|
| 1,826,455 | 10/1931 | Comstock et al. | 51—309 |
| 1,977,049 | 10/1934 | Doutt | 51—76 |
| 2,231,921 | 2/1941 | Kitlar et al. | 51—76 X |
| 3,169,352 | 2/1965 | Smith | 51—140 |
| 3,462,887 | 8/1969 | Hackman | 51—206 |
| 3,491,740 | 1/1970 | Kohlstrunk | 51—206 X |

OTHELL M. SIMPSON, Primary Examiner

U.S. Cl. X.R.

51—206